US008824961B2

(12) United States Patent
Royston (10) Patent No.: US 8,824,961 B2
(45) Date of Patent: Sep. 2, 2014

(54) METHOD AND APPARATUS FOR REDUCING NFC MULTI-PROTOCOL POLLING DURATION AND POWER CONSUMPTION

(75) Inventor: Philip Stewart Royston, Newbury (GB)

(73) Assignee: Broadcom Corporation, Irvine, CA (US)

( * ) Notice: Subject to any disclaimer, the term of this patent is extended or adjusted under 35 U.S.C. 154(b) by 278 days.

(21) Appl. No.: 13/170,999

(22) Filed: Jun. 28, 2011

(65) Prior Publication Data
US 2013/0005242 A1 Jan. 3, 2013

(51) Int. Cl.
*H04B 7/00* (2006.01)
(52) U.S. Cl.
USPC ......... 455/41.1; 455/41.2; 455/107; 455/106; 455/101; 455/73
(58) Field of Classification Search
USPC ................ 455/41.2, 107, 106, 101, 41.1, 73; 340/10.1, 10.2, 10.34, 10.4, 572.1, 340/5.65
See application file for complete search history.

(56) References Cited

U.S. PATENT DOCUMENTS

| 3,870,994 | A | * | 3/1975 | McCormick et al. ............ 342/42 |
| 3,878,528 | A | * | 4/1975 | Majeau ............................... 342/44 |
| 6,946,950 | B1 | * | 9/2005 | Ueno et al. ..................... 340/10.1 |
| 7,734,307 | B2 | | 6/2010 | Dawidowsky |
| 7,845,568 | B2 | * | 12/2010 | Parlange et al. ............... 235/492 |
| 2006/0061473 | A1 | * | 3/2006 | Shanks et al. ................ 340/572.1 |
| 2009/0079571 | A1 | | 3/2009 | Calvarese |
| 2010/0026454 | A1 | | 2/2010 | Rowse et al. |
| 2010/0105324 | A1 | | 4/2010 | Takayama |
| 2010/0128773 | A1 | * | 5/2010 | Fukuda et al. ................. 375/232 |
| 2011/0143686 | A1 | * | 6/2011 | Rofougaran ..................... 455/73 |
| 2011/0159816 | A1 | * | 6/2011 | Takayama .................... 455/41.2 |
| 2012/0309303 | A1 | * | 12/2012 | Hillan et al. ................. 455/41.1 |

FOREIGN PATENT DOCUMENTS

| CN | 1767409 A | 5/2006 |
| CN | 101809588 A | 8/2010 |
| WO | WO 2007/096797 A2 | 8/2007 |

OTHER PUBLICATIONS

NFC Forum, "NFC Digital Protocol, Technical Specification, NFC Forum™, Digital 1.0, NFCForum-TS-DigitalProtocol-1.0," 194 pages, NFC Forum, United States (Nov. 2010).
NFC Forum, "NFC Activity Specification, Technical Specification, NFC Forum™, Activity 1.0, NFCForum-TS-Activity-1.0," 117 pages, NFC Forum, United States (Nov. 2010).
International Standard, No. 1531, Reference No. of document: ISO/IEC FCD 14443-3, Committee identification: ISO/IEC JTC1/SC17/WG8, Final Committee Draft, "ISO/IEC 14443-3, Identification cards—Contactless integrated circuit(s) cards—Proximity cards—Part 3: Initialization and anticollision," Baddeley, D. (ed.), 48 pagse, ISO/IEC , Switzerland (Nov. 1999).

(Continued)

*Primary Examiner* — Ganiyu A Hanidu
(74) *Attorney, Agent, or Firm* — Sterne, Kessler, Goldstein & Fox P.L.L.C.

(57) ABSTRACT

A method and apparatus are disclosed for polling for near field communications (NFC) devices by checking for multiple protocols. A NFC device polls for devices by first maintaining an unmodulated carrier field active for a specific period of time. The NFC device then polls using a first modulation and waits for a response. If there is no response, and without again maintaining another unmodulated carrier field for a specific period of time, the NFC device polls using a second modulation that is greater than the first modulation and waits again for a response.

24 Claims, 9 Drawing Sheets

(56) References Cited

OTHER PUBLICATIONS

International Standard, No. 18092, Reference No. ISO/IEC 18092:2004(E), First Edition, "Information technology—Telecommunications and information exchange between systems—Near Field Communication—Interface and Protocol (NFCIP-1)," 66 pages, ISO/IEC, Switzerland (Apr. 2004).

International Standard, No. 21481, Reference No. ISO/IEC 21481:2005(E), First Edition, "Information technology—Telecommunications and information exchange between systems—Near Field Communication Interface and Protocol—2 (NFCIP-2)," 12 pages, ISO/IEC, Switzerland (Jan. 2005).

Office Action for related Taiwanese Patent Application No. 101121728, mailed Feb. 5, 2013; 7 pages.

Office Action directed to related Chinese Patent Application No. 201210224404, mailed Apr. 29, 14; 5 pages.

\* cited by examiner

METHOD AND APPARATUS FOR REDUCING NFC MULTI-PROTOCOL POLLING DURATION AND POWER CONSUMPTION

BACKGROUND

1. Field of Invention

The invention relates to near field communications (NFC), and more specifically to reducing the multi-protocol polling duration, and thereby power consumption, for a polling NFC device.

2. Related Art

Near field communication (NFC) requires that NFC devices be present within a relatively small distance from one another so that their corresponding magnetic fields can exchange information. Ranges of up to several centimeters (generally a maximum of 0.1 meter) are common for NFC devices. Typically, a first NFC device transmits or generates a magnetic field modulated with the information, such as credit information or ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device.

A NFC reader is a type of NFC device that is capable of operating in an initiator mode to initiate a communication with another NFC enabled device. A NFC tag is a type of NFC device that is capable operating in a target mode to respond to the initiation of a communication by another NFC enabled device. A NFC communicator is a type of NFC device that is capable of operating in the initiator mode or in the target mode and is capable of switching between these two modes.

In a conventional polling procedure, the NFC reader or the NFC communicator generates a magnetic field and probes the magnetic field for the NFC tag or another NFC communicator. The conventional polling procedure contemplates multiple technologies, including Type A technology, Type B technology, and Type F (FeliCa) technology. The differences between the different technologies include modulation methods, coding schemes, and protocol initialization procedures. An example of the conventional polling procedure is described in "NFC Forum: NFC Activity Specification: Technical Specification, NFC Forum™ Activity 1.0 NFCForum-TS-Activity-1.0," published Nov. 18, 2010 (hereinafter the "NFC Activity Specification"), and "NFC Forum: NFC Digital Protocol: Technical Specification, NFC Forum™ Digital 1.0 NFCForum-TS-DigitalProtocol-1.0," published Nov. 17, 2010 (hereinafter the "NFC Digital Protocol"), which are incorporated by reference herein in their entirety.

The conventional polling procedure requires the NFC reader or the NFC communicator to initially generate the magnetic field for between 5 ms and 20 ms, conventionally referred to as a guard time, depending on the type of tag technology being used. Generation of the magnetic field for a duration of the guard time can use a high amount of current, conventionally, up to 250 mA to generate the magnetic field. The guard time is required before transmission of a polling command for each type of technology −5 ms for Type A and as well as for B, and 20 ms for Type F.

What is needed is a method and an apparatus to probe the magnetic field for NFC devices of differing technology types which reduces the duration that the magnetic field that is generated before sending the polling command to decrease the amount of power consumed during the polling procedure.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in the relevant art(s), readily modify and/or adapt for various applications such exemplary embodiments, without undue experimentation, and without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in the relevant art(s) in light of the teachings herein.

Although the description of the present invention is to be described in terms of NFC devices and NFC enable devices, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

Figure 1:
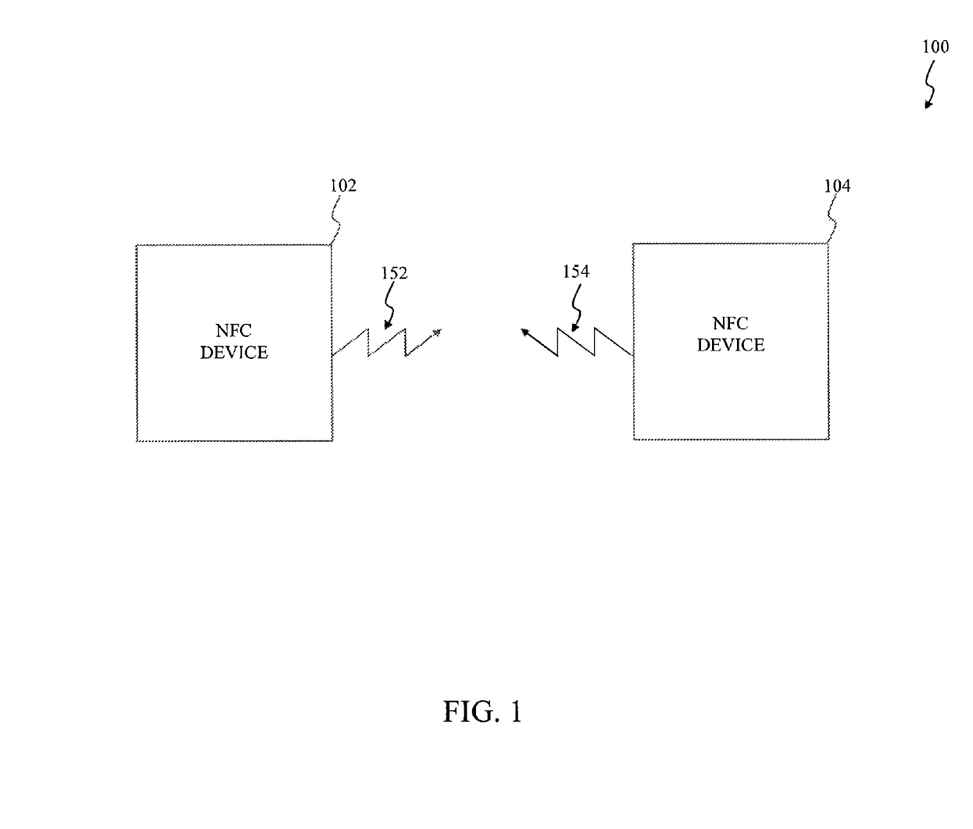
FIG. 1 illustrates a block diagram of a NFC environment according to an exemplary embodiment of the invention.

FIG. 1 illustrates a block diagram of a NFC environment according to an exemplary embodiment of the invention. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

The first NFC device 102 generates a magnetic field and probes the magnetic field for the second NFC device 104. The second NFC device 104 may be implemented using a Type A technology, a Type B technology, or a Type F technology. Type A and Type B technology are further defined in the NFC Activity Specification and/or ISO/IEC 14443-3, "Identification cards—Contactless integrated circuit(s) cards—Proximity cards—Part 3: Initialization and anticollision," published on Jun. 11, 1999, which is incorporated herein by reference in its entirety. Type F technology is farther defined in the NFC Activity Specification, which is incorporated by reference herein in its entirety. Various conventional polling procedures to probe the magnetic field for these technology types are discussed below.

Conventional Operation of Single Protocol Polling

Figure 2:
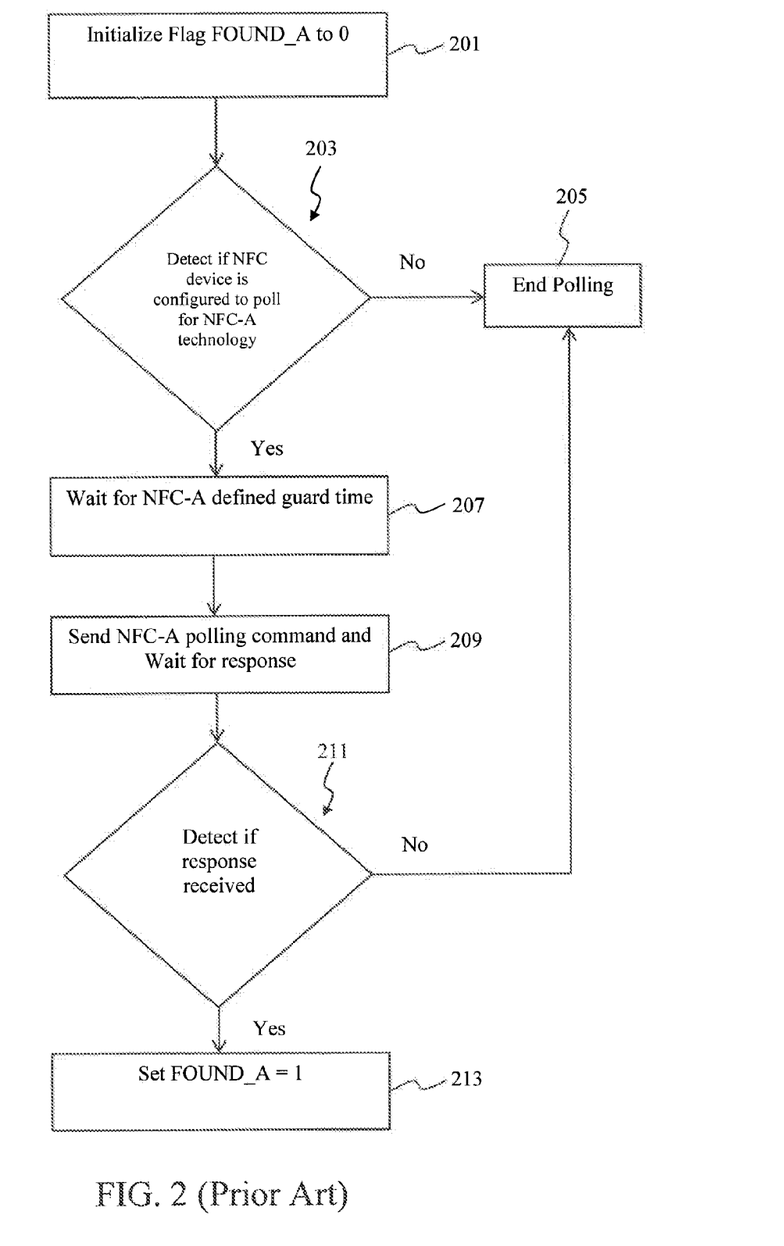
FIG. 2 is a flowchart of conventional operational steps for polling for Type A NFC technology tags.

FIG. 2 illustrates conventional operational steps for polling for Type A NFC technology tags. At step 201, a NFC reader initializes a flag FOUND_A to 0.

At step 203, the NFC reader determines whether it is configured to poll for Type A NFC technology tags. If the NFC reader is configured to poll for Type A NFC technology tags, then the conventional operation continues to step 207. Otherwise, the NFC reader ends the polling procedure in step 205.

At step 207, the NFC reader generates a magnetic field without a polling command, commonly referred to as an unmodulated carrier field. The unmodulated carrier field must be maintained for at least the amount of time that is specified by the NFC Digital Protocol to allow for any Type A NFC technology tags within the unmodulated carrier field to derive or harvest sufficient power to communicate. This required period of time, the guard time, is set at a minimum of 5 ms for Type A technology.

At step 209, the NFC reader transmits the polling command using the magnetic field, commonly referred to as a modulated carrier field, to Type A NFC technology tags that may be within the magnetic field. The polling command lasts for 86 microseconds. Only those tags that are Type A NFC technology tags will provide a response to the polling command. The NFC reader waits 100 microseconds for the response from the Type A NFC technology tags.

At step 211, if the NFC reader has not received a response from any Type A NFC technology tags, the NFC reader ends polling by moving to step 205. Otherwise, if the NFC reader has received a response from a Type A NFC technology tag, the conventional operation proceeds to step 213.

At step 213, the NFC reader sets the flag FOUND_A equal to 1, and ends polling and begins communicating with the detected device(s).

The operational steps for polling for Type B and Type F NFC technology tags is substantially similar to those for Type A. Similar to the guard time for Type A NFC technology tags, the guard time for Type B NFC technology tags is a minimum of 5 ms. However, the guard time for Type F NFC technology tags is a minimum of 20 ms.

Conventional Method of Multi-Protocol Polling

Conventionally, the NFC Activity Specification provides a conventional polling loop for a NFC reader to detect a tag that may be of any particular technology type (A, B, or F). The conventional polling loop checks first for Type A NFC technology tags, then Type B NFC technology tags, then Type F NFC technology tags, and then allows for polling for any other tags based on proprietary technology.

Figure 3:
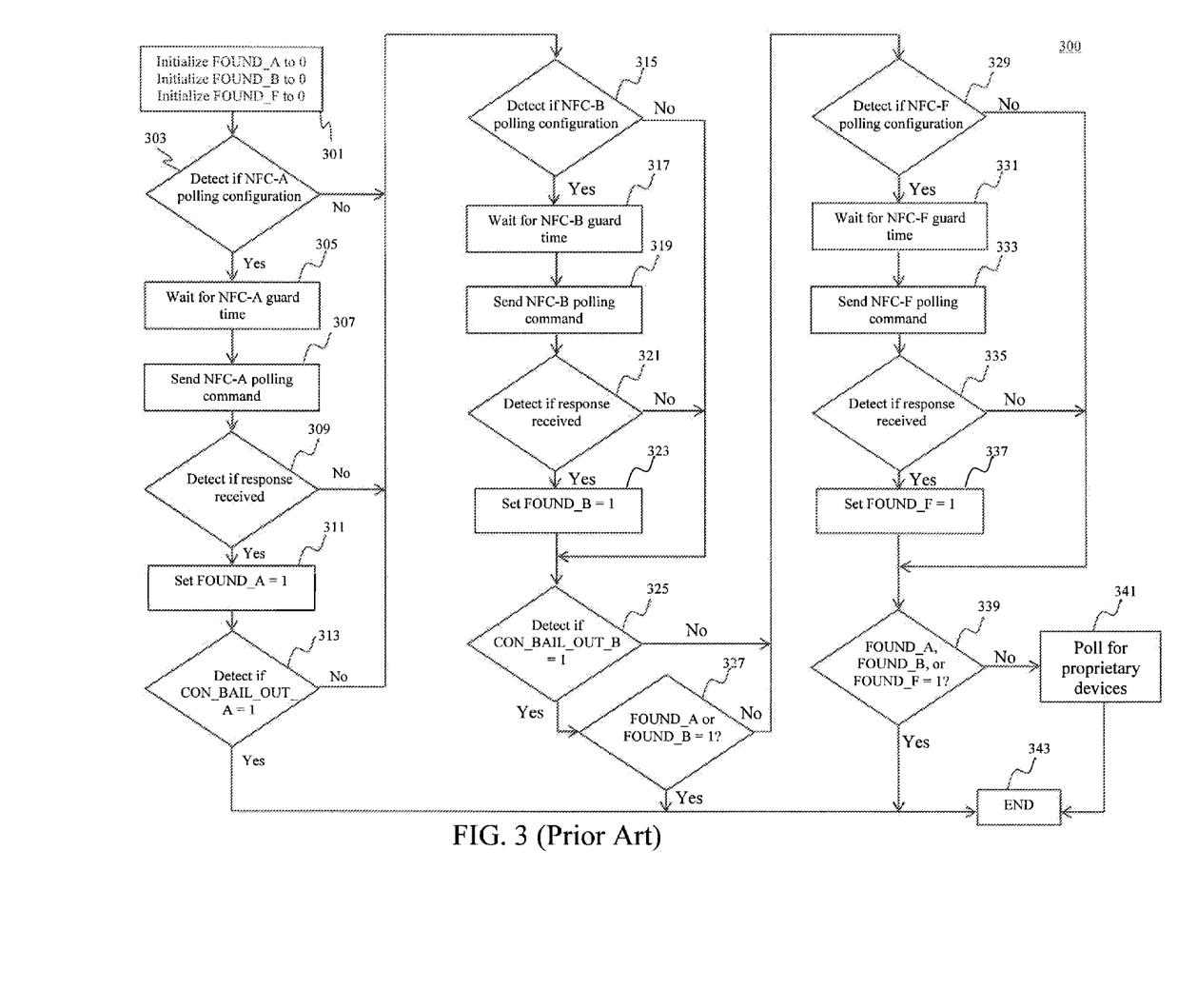
FIG. 3 is a flowchart of operational steps for multi-protocol polling according to the NFC Activity Specification.

FIG. 3 illustrates a conventional polling loop 300 for polling for Type A, B, and F NFC technology tags. At step 301, the NEC reader initializes the flags FOUND_A, FOUND_B, and FOUND_F to 0.

At step 303, the NFC reader determines whether it is configured to poll for Type A NFC technology tags. If the NFC reader is configured to poll for Type A NFC technology tags, then the NFC reader continues to step 305. Otherwise, the NFC reader proceeds to step 315 to begin polling for Type B NFC technology tags.

At step 305, the NFC reader generates the unmodulated carrier field. The unmodulated carrier field must be maintained for at least the guard time of 5 ms to allow for any NFC tags within the unmodulated carrier field to derive or harvest sufficient power to communicate.

At step 307, the NFC reader modulates the carrier field with the polling command for Type A NFC technology tags. The polling command lasts for 86 microseconds. Only those tags that are Type A NFC technology tags will provide a response to the polling command. The NFC reader waits 100 microseconds for the response from the Type A NFC technology tags.

At step 309, if the NFC reader has not received a response from any Type A NFC technology tag, the NFC reader ends polling for Type A NFC technology tags and proceeds to step 315 to begin polling for Type B NFC technology tags. Otherwise, if the NFC reader has received a response from a Type A NFC technology tag, the conventional polling loop 300 proceeds to step 311. At step 311, because the NFC reader has received a response, it sets the flag FOUND_A equal to 1.

At step 313, the NFC reader checks whether it has been configured to bail out after detecting one or more Type A NFC technology tags. The NFC reader has been configured to bail out upon detecting one or more Type A NFC technology tags when a flag CON_BAIL_OUT_A has been set equal to 1. When this is set to 1, the NFC reader proceeds to step 343 to end the polling procedure and begins communicating with the detected device(s). If the flag CON_BAIL_OUT_A has not been set equal to 1, then the conventional polling loop 300 proceeds to step 315 to begin polling for Type B NFC technology tags.

At step 315, the NFC reader determines whether it is configured to poll for Type B NFC technology tags. If the NFC reader is configured to poll for Type B NFC technology tags, then the NFC reader continues to step 317. Otherwise, the NFC reader ends the polling procedure for Type B NFC technology tags and moves to step 325.

At step 317, the NFC reader generates the unmodulated carrier field. The unmodulated carrier field must be maintained for at least the guard time of 5 ms to allow for any Type B NFC technology tags within the unmodulated carrier field to derive or harvest sufficient power to communicate.

At step 319, the NFC reader modulates the carrier field with the polling command for Type B NFC technology tags. The polling command lasts for 86 microseconds. Only those tags that are Type B NFC technology tags will provide a response to the polling command. The NFC reader waits 100 microseconds for the response from the Type B NFC technology tags.

At step 321, if the NFC reader has not received a response from any Type B NFC technology tag, the NFC reader ends polling for Type B NFC technology tags and proceeds to step 325. Otherwise, if the NFC reader has received a response from one or more Type B NFC technology tags, the conventional polling loop 300 proceeds to step 323. At step 323, because the NFC reader has received a response, it sets the flag FOUND_B equal to 1.

At step 325, the NFC reader checks whether it has been configured to bail out after detecting one or more Type B NFC technology tags. The NFC reader has been configured to bail out upon detecting one or more Type B NFC technology tags when a flag CON_BAIL_OUT_B has been set equal to 1. When this is set to 1, the NFC reader proceeds to step 327 to end the polling procedure and begins communicating with the detected device(s). If the flag CON_BAIL_OUT_A has not been set equal to 1, then the conventional polling loop 300 proceeds to step 327.

At step 327, the NFC reader checks if either the flag FOUND_A or the flag FOUND_B has been set to 1. If either has been set to 1, the conventional polling loop 300 proceeds to step 343 to end the polling procedure. If neither the flag FOUND_A nor the flag FOUND_B has been set to 1, then the conventional polling loop 300 proceeds to begin polling for Type F NFC technology tags at step 329.

At step 329, the NFC reader determines whether it is configured to poll for Type F NFC technology tags. If the NFC reader is configured to poll for Type F NFC technology tags, then the NFC reader continues to step 331. Otherwise, the NFC reader ends the polling procedure for Type F NFC technology and moves to step 339.

At step 331, the NFC reader generates the unmodulated carrier field. The unmodulated carrier field must be maintained for at least the guard time of 20 ms to allow for any Type F NFC technology tags within the unmodulated carrier field to derive or harvest sufficient power to communicate.

At step 333, the NFC reader modulates the carrier field with the polling command for Type F NFC technology tags. The polling command lasts for 86 microseconds. Only those tags that are Type F NFC technology tags will provide a response to the polling command. The NFC reader waits 100 microseconds for the response from the Type F NFC technology tags.

At step 335, if the NFC reader has not received a response from any Type F NFC technology tag, the NFC reader ends polling for Type F NFC technology tags and proceeds to step 339. Otherwise, if the NFC reader has received a response from a Type F NFC technology tag, the conventional polling loop 300 proceeds to step 337.

At step 337, because the NFC reader has received a response, it sets the flag FOUND_F equal to 1.

At step 339, the NFC reader checks if the flag FOUND_A, the flag FOUND_B, or the flag FOUND_F has been set to 1. If any of these has been set to 1, the conventional polling loop 300 proceeds to step 343 to end the polling procedure. If none of them have been set to 1, then the conventional polling loop 300 proceeds to begin polling for proprietary tags at step 341.

Step 341 includes checking for whether the NFC reader has been configured to poll for proprietary tags. If the NFC reader has been configured to poll for proprietary tags, then the NFC reader waits for the guard time specified by the proprietary technology. The NFC Activity Specification does not contemplate the proprietary processing and parameters as within its scope, and therefore is not included in this specification. After the NFC reader, if necessary, completes polling for proprietary tags, it concludes polling at step 343.

As can be seen from above, when the conventional polling loop 300 checks for both Type A and Type B NFC technology tags, the NFC reader generates the magnetic field for 10,372 μs.

Conventional Coding/Modulation Schemes

As discussed above, Type A, Type B, and Type F technologies may be characterized as having different modulation methods, coding schemes, and protocol initialization procedures to provide some examples.

Figure 4:
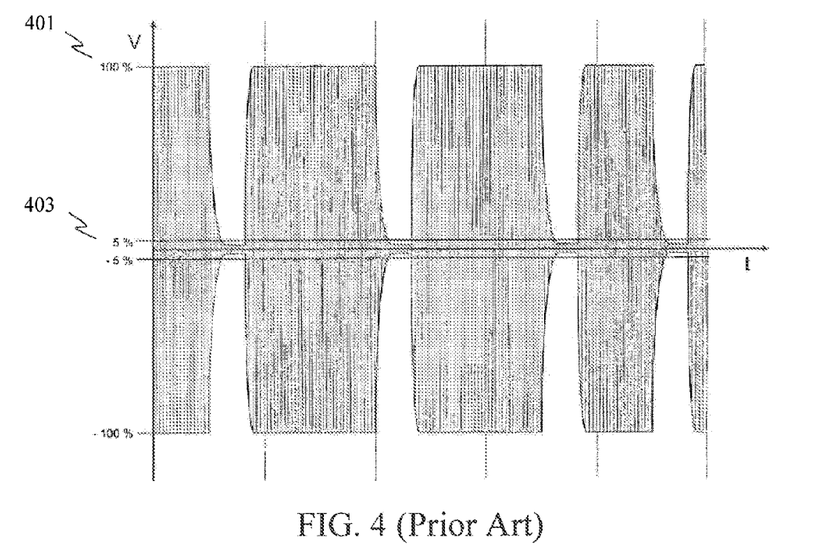
FIG. 4 illustrates a polling signal using Miller coding with 100% ASK modulation.

FIG. 4 illustrates a conventional coding and modulation scheme used on polling signals for Type A NFC technology tags. This conventional scheme uses a modified form of Miller coding with 100% Amplitude Shift Keying (ASK) modulation. Using 100% ASK modulation, Type A NFC technology tags recognize the modulation when the amplitude of the polling signal changes by over 95%, as shown in FIG. 4. No modulation exists at voltage amplitude 401, or 100% amplitude. Modulation exists when the polling signal is at voltage 403, or less than 5% amplitude.

Figure 5:
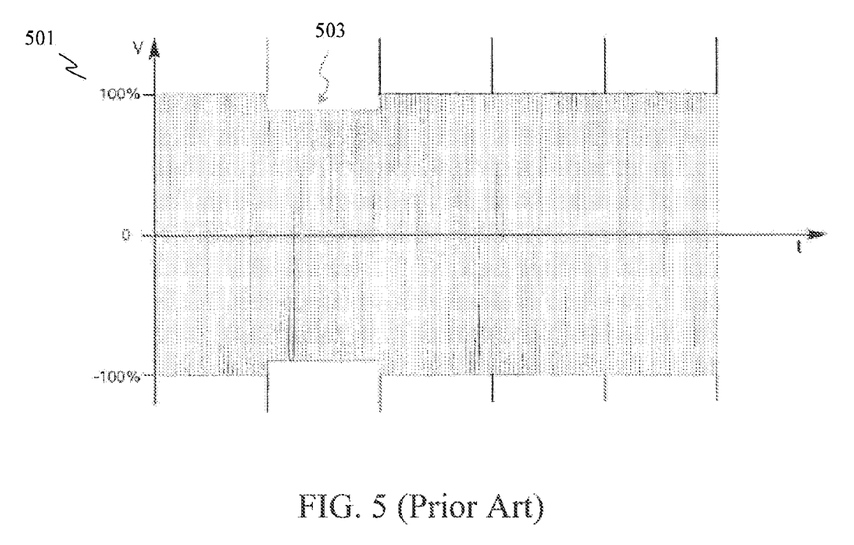
FIG. 5 illustrates a polling signal with using NRZ-L coding with 10% ASK modulation.

FIG. 5 illustrates a conventional coding and modulation scheme used on polling signals for Type B NEC technology tags. This scheme uses NRZ-L coding with 10% ASK modulation. Type B NFC technology tags recognize modulation when the amplitude of the polling signal changes by 10%. No modulation exists at voltage amplitude 501, or 100% amplitude. A state of modulation exists when the polling signal is at voltage amplitude 503, or 90% amplitude. Type B NFC technology tags recognize a polling signal when the amplitude varies by 10% from the no modulation state.

Figure 6:
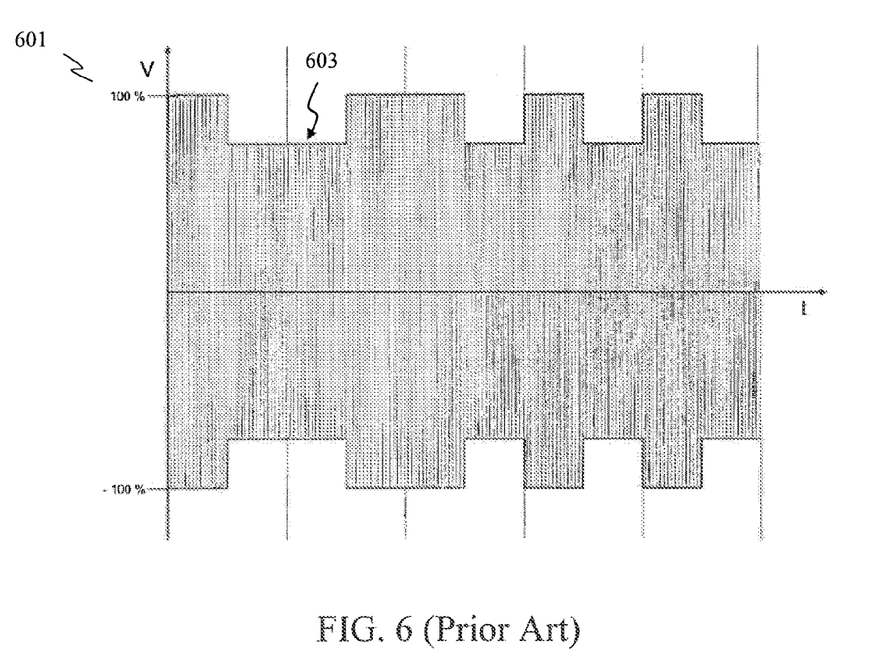
FIG. 6 illustrates a polling signal using Manchester coding with less than 100% ASK modulation.

FIG. 6 illustrates a conventional coding and modulation scheme used on polling signals for Type F NFC technology tags. This scheme uses Manchester coding with less than 100% ASK modulation. Type F NFC technology tags recognize modulation when the amplitude of the polling signal changes by less than that used in the modulation for Type A NFC technology tags. No modulation exists at voltage amplitude 601, or 100% amplitude. Modulation exists when the polling signal is at voltage amplitude 603. Type F NFC technology tags recognize a polling signal as modulated when the amplitude varies by less than 100% from the no modulation state.

The present invention arranges the polling loop so that the NFC reader first polls for tags that use less than 100% ASK modulation, and then polls for tags that use 100% ASK modulation. In this way, the tags that use 100% ASK modulation view the first poll for tags that use less than 100% ASK modulation as essentially a long guard time, thus eliminating the need for a second guard time before polling for the tags that use 100% ASK modulation.

Exemplary Method for Multi-Protocol Polling

Figure 7:
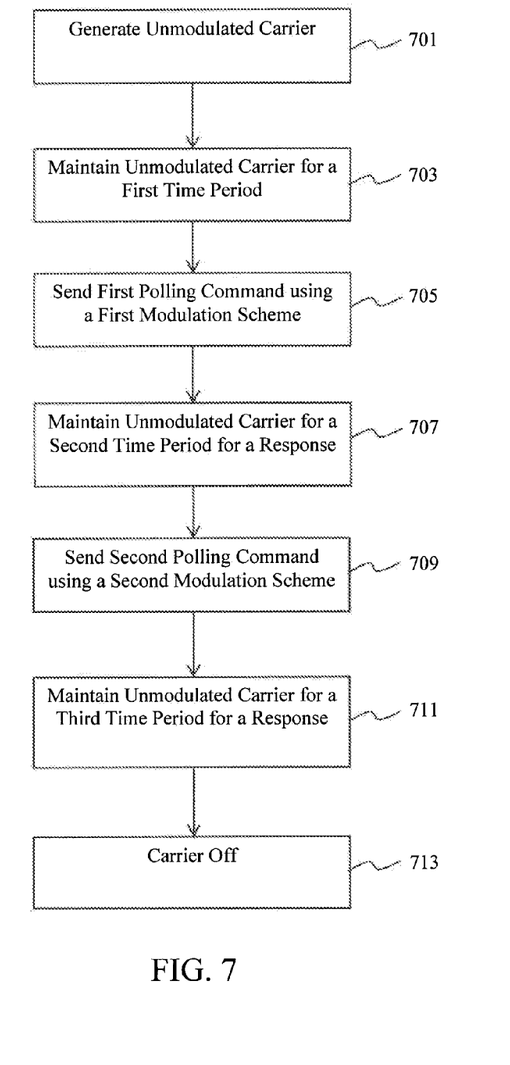
FIG. 7 is a flowchart of exemplary operational steps for multi-protocol polling according to an exemplary embodiment of the invention.

FIG. 7 illustrates a method of multi-protocol polling of NFC devices according to an exemplary embodiment of the invention. The invention is not limited to this description. Rather, it will be apparent to persons skilled in the relevant art(s) from the teachings herein that other multi-protocol polling methods are within the scope and spirit of the present invention. The following discussion describes the steps in FIG. 7.

At step 701, a first NFC device, such as the first NFC device 102 to provide an example, generates the unmodulated carrier field to allow a second NFC device, such as the second NFC device 104 to provide an example, to reset from any previous spurious commands.

At step 703, the first NFC device maintains the unmodulated carrier field for a first time period to enable the second NFC device to derive or harvest power to allow communication between the devices.

At step 705, the first NFC device transmits a first polling command using a first modulation scheme on the carrier field, typically according to a first protocol, to provide the modulated carrier field. This first modulation scheme is characterized by a first amplitude. If the second NFC device is responsive to a different modulation scheme that has a second amplitude that is greater than the first amplitude, it will not recognize the modulated carrier field as including the first polling command. Rather, the modulated carrier field will appear to the second NFC device as being the unmodulated carrier field from which the second NFC device will be able to derive or harvest power.

At step 707, the first NFC device continues to provide the unmodulated carrier field for a second time period to detect any response to the first polling command.

At step 709, the first NFC device transmits a second polling command using the second modulation scheme on the carrier field, typically according to a second protocol, to provide the modulated carrier field upon expiration of the second time period. This second modulation scheme is characterized by a second amplitude that is greater than the first amplitude.

At step 711, the first NFC device continues to provide the unmodulated carrier field for a third time period to detect any response to the second polling command.

At step 713, the first NFC device then ends the polling procedure and turns the carrier field off if it did not detect any devices.

Figure 8:
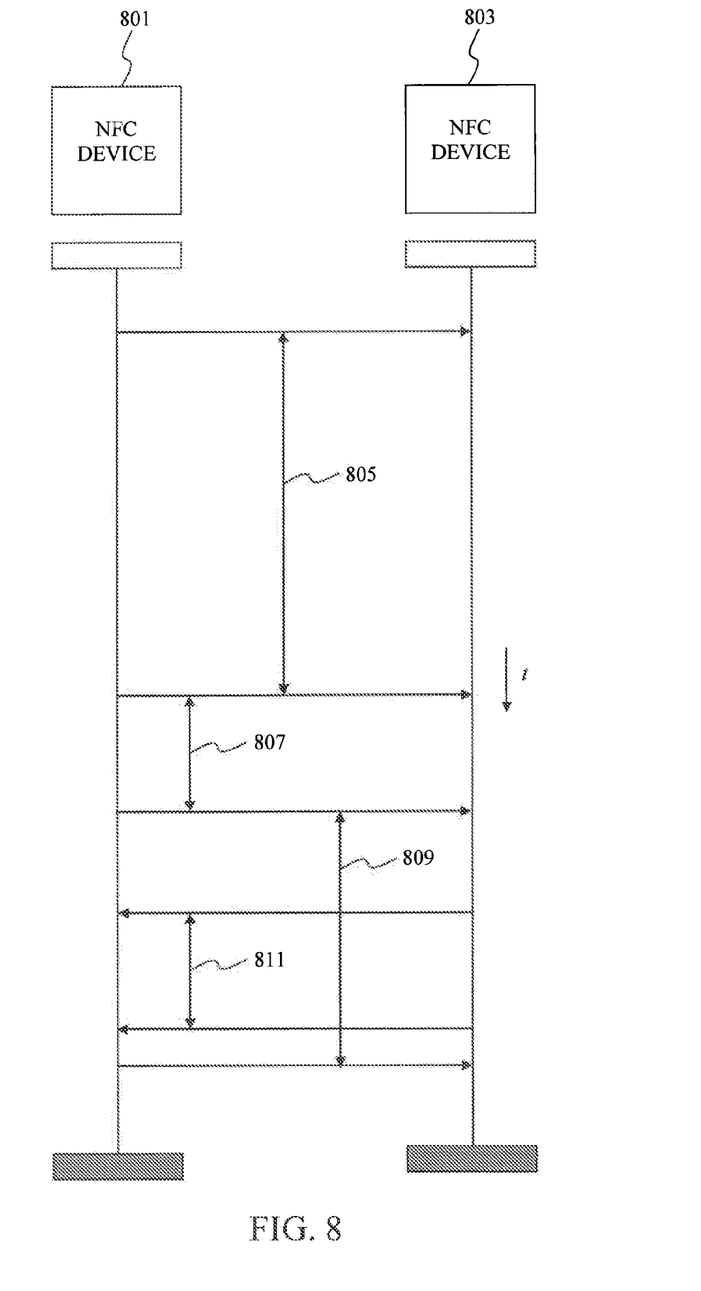
FIG. 8 illustrates the signal flow that occurs when a first NFC device polls for a second NFC device.

FIG. 8 illustrates a first polling procedure used by a first NFC device to poll for a second NFC device according to an exemplary embodiment of the invention. A first NFC device 801 polls for a second NFC device 803 using a first polling procedure. The first NFC device 801 and the second NFC device 803 may represent an exemplary embodiment of the first NFC device 102 and the second NFC device 104, respectively.

As shown in FIG. 8, the first NFC device 801 generates the unmodulated carrier field 805 for a first time period to allow the second NFC device 803 sufficient time to derive or harvest sufficient power to communicate. The first NFC device 801 modulates a polling command onto the unmodulated carrier field using a first modulation scheme to provide a modulated carrier field 807. The first NFC device 801 generates the unmodulated carrier field 809 for a second time period to allow the second NFC device 803 sufficient time to derive or harvest sufficient power to provide a response to the polling command.

In the exemplary embodiment as shown in FIG. 8, the second NFC device 803 is configured to operate in accordance with the first modulation scheme. Therefore, the second NFC device 803 modulates the unmodulated carrier field 809 with a response 811 to the polling command during the second time period.

Figure 9:
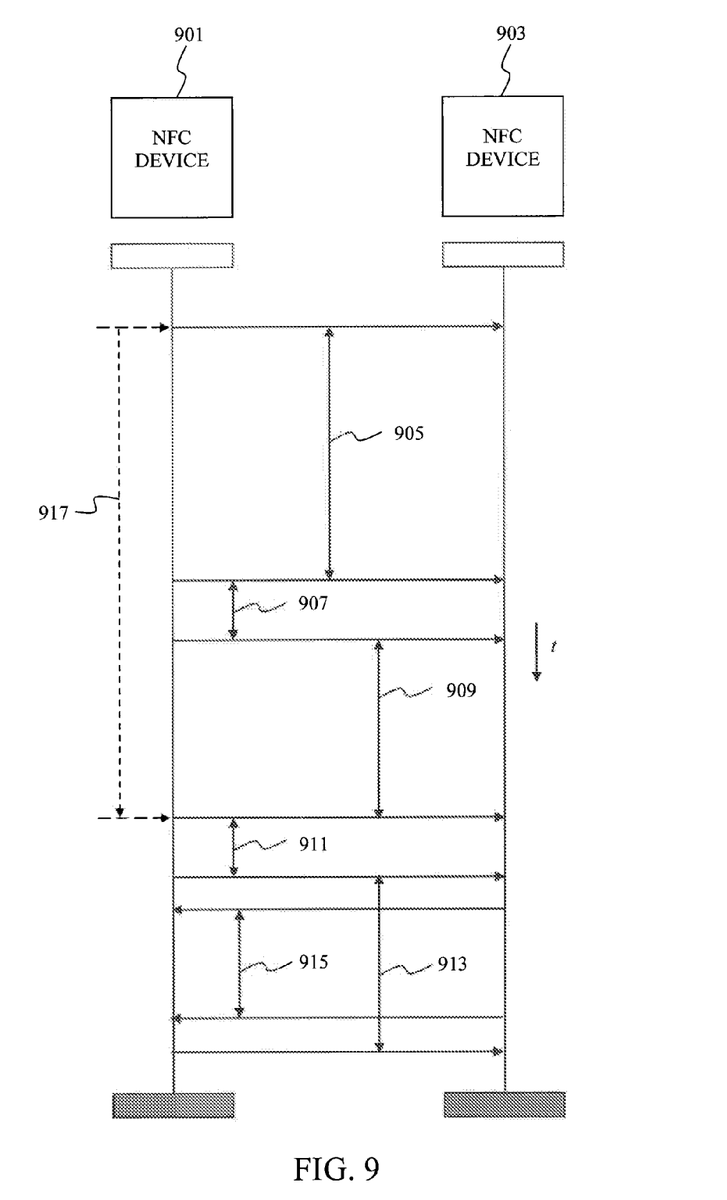
FIG. 9 illustrates the signal flow and timing overlap that occurs in multi-protocol polling according to an exemplary embodiment of the invention.

FIG. 9 illustrates a second polling procedure used by a first NFC device to poll for a second NFC device according to an exemplary embodiment of the invention. A first NFC device 901 also polls for a second NFC device 903 using a second polling procedure. The first NFC device 901 and the second NFC device 903 may represent an exemplary embodiment of the first NFC device 102 and the second NFC device 104, respectively.

As shown in FIG. 9, the first NFC device 901 generates the unmodulated carrier field 905 for a first time period to allow the second NFC device 903 sufficient time to derive or harvest sufficient power to communicate. The first NFC device 901 modulates a first polling command onto the unmodulated carrier field using a first modulation scheme to provide a modulated carrier field 907. The first NFC device 901 generates the unmodulated carrier field 909 for a second time period to allow the second NFC device 903 sufficient time to derive or harvest sufficient power to provide a response to the polling command.

In the exemplary embodiment as shown in FIG. 9, the second NFC device 903 is not configured to operate in accordance with the first modulation scheme. Therefore, the second NFC device 903 does not provide a response 909 to the first polling command during the second time period.

The first NFC device 901 modulates a second polling command onto the unmodulated carrier field using a second modulation scheme to provide a modulated carrier field 911. The first NFC device 901 generates the unmodulated carrier field 913 for a third time period to allow the second NFC device 903 sufficient time to derive or harvest sufficient power to provide a response to the second polling command.

In the exemplary embodiment as shown in FIG. 9, the second NFC device 903 is configured to operate in accordance with the second modulation scheme. Therefore, the second NFC device 903 provides a response 915 to the second polling command during the third time period.

As illustrated in FIG. 9, if the first NFC device 901 has not received a response to the first polling command, then the first NFC device 901 provides a second polling command using the second modulation scheme. The amplitude of the second modulation scheme is greater than the amplitude of the first modulation scheme, such that when the first NFC device 901 sends the first polling command with the first modulation scheme, the second NFC device 903 configured to operate in accordance with the second modulation scheme would not recognize the first polling command at the first modulation scheme. Because the first modulation scheme has the first amplitude modulation that is lower than the second modulation scheme's second amplitude modulation, the entire time 917 the first NFC device 901 polls using the first modulation scheme appears as, effectively, a long unmodulated carrier field to the second NFC device 903 that uses the second modulation scheme. The time 917 therefore appears as a long guard time, during which the second NFC device 903 is deriving or harvesting power from the first NFC device 901.

For example, the first modulation scheme may be characterized as being the NRZ-L coding with 10% ASK modulation as shown in FIG. 5. The modulation scheme in FIG. 5 uses a 10% amplitude modulation, or a modulation that varies from 100% voltage to 90% voltage amplitude. When this variance in amplitude occurs the second NFC device 903, when configured to operate in accordance with the first modulation scheme, recognizes the first polling signal and responds thereto. In contrast, if the second NFC device 903, when configured to operate in accordance with the second modulation scheme, such as the modified form of Miller coding with 100% ASK modulation as shown in FIG. 4, then it will not recognize the first polling command as anything but an unmodulated carrier field with occasional, small variances in the amplitude.

As another example, the first modulation scheme could be used to probe for Type B NFC technology tags and the second modulation scheme could be used to probe for Type A NFC technology tags. In this example, the second NFC device 903, when configured to operate as a Type B NFC technology tag, recognizes the first polling command and responds thereto. In contrast, if the second NFC device 903 is configured to operate as a Type A NFC technology tag, it will not recognize the first polling command as anything but an unmodulated carrier field with occasional, small variances in the amplitude.

Additionally and alternatively, the first modulation could be for Type F NFC technology tags and the second modulation could be for Type A NFC technology tags.

Referring again to FIG. 1, upon establishing communication with the second NFC capable device 104, the first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by applying its corresponding information to the first carrier wave that is inductively coupled onto the second antenna to provide the second modulated information communication 154.

Further operations of the first NFC device 102 and/or the second NFC device 104 may be described in International Standard ISO/IEC 18092:2004(E), "Information Technology—Telecommunications and Information Exchange Between Systems—Near Field Communication—Interface and Protocol (NFCIP-1)," published on Apr. 1, 2004 and International Standard ISO/IEC 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Exemplary Apparatus for Multi-Protocol Polling

Figure 10:
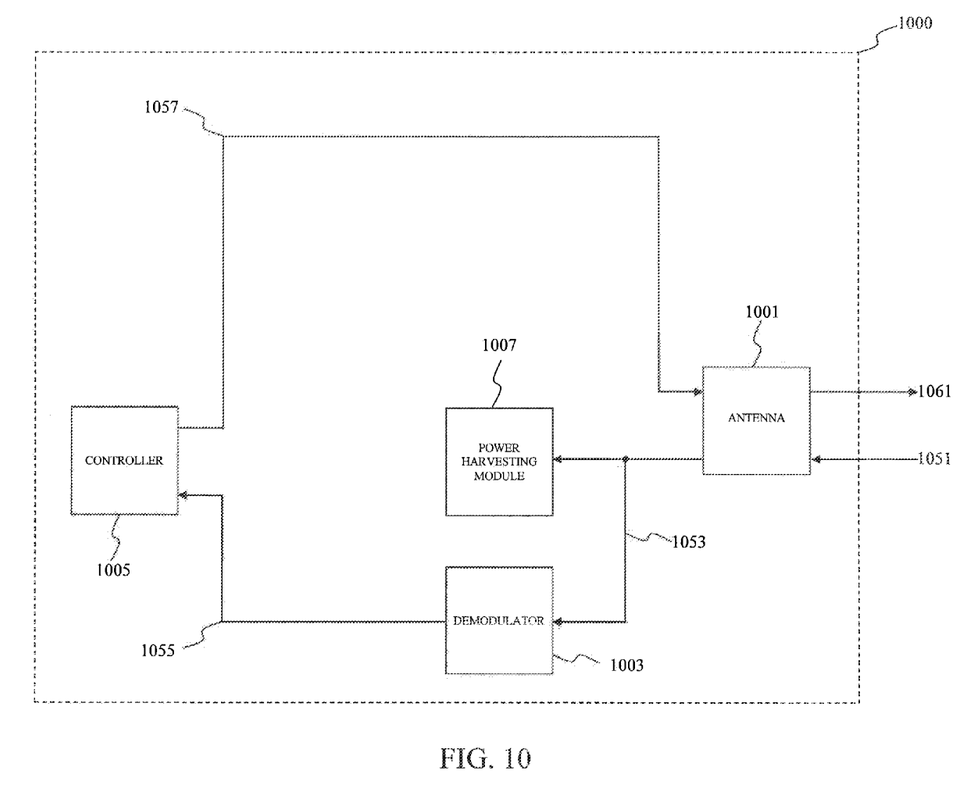
FIG. 10 illustrates a block diagram of a NFC device that may be used according to an exemplary embodiment of the invention.

FIG. 10 illustrates a block diagram of a NFC device that may be used according to an exemplary embodiment of the invention. A NFC device 1000 is configurable to operate in the target, or tag, mode of operation to respond to a polling command from another NFC capable device, such as the NFC device 102 or the NFC device 104 to provide some examples, in a polling mode of operation. The NFC device 1000 includes an antenna module 1001, a demodulator module 1003, a controller module 1005, and a power harvesting module 1007. The NFC device 1000 may represent an exemplary embodiment of the NFC device 102.

The antenna module 1001 inductively receives a communications signal 1051 from the other NFC capable device to provide a recovered communications signal 1053. Typically, the received communications signal 1051 includes a polling command which has been modulated from the other NFC capable device.

The demodulator module 1003 demodulates the recovered communications signal 1053 using any suitable analog or digital modulation technique to provide a recovered command 1055. The recovered command 1055 may be the polling command. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

When the demodulator module 1003 is within a Type A NFC technology tag, it detects polling commands based on 100% ASK modulation. The voltage amplitude must drop substantially to zero, such that the demodulator module 103 functions as a gap detector for Type A technology tags. In this situation, any modulation based on another modulation scheme that does not drop below the threshold required for Type A NFC technology tags may be given the digital value of 1. When the amplitude drops low enough, the demodulator module 1003 gives it the digital value of 0 in accord with the modified Miller coding scheme.

When the demodulator module 1003 is within a Type B NFC technology tag, it detects polling commands based on 10% ASK modulation. The demodulator module 1005 has a voltage threshold that is at 90% of the total modulation amplitude. If the polling command's modulation decreases below that threshold, the demodulator module 1003 gives it the digital value of 0 in accord with the NRZ-L coding scheme. In this situation, any modulation based on another protocol may drop below the threshold required for Type B NFC technology tags and therefore be given the digital value of 0. Any modulation that remains above this threshold would be given the digital value of 1.

When the demodulator module 1003 is within a Type F NFC technology tag, it detects polling commands based on a Manchester coding scheme that uses a modulation threshold between that used for Type A and that used for Type B NFC technology tags. If the polling command's modulation decreases below this threshold, it will be given the digital value of 0. Any modulation that remains above this threshold would be given the digital value of 1.

As can be seen from the above, a Type A NFC technology tag will not assign a digital value of 0 to any modulation based on Type B or Type F NFC technology tags because the modulation amplitude would not fall below the threshold required for 100% ASK modulation. Thus, the demodulator module 1003 in a Type A NFC technology tag would not detect a polling command sent to detect a Type B or Type F NFC technology tag.

Moving on to other aspects of the NFC device 1000, the controller module 1005 controls overall operation and/or configuration of the NFC device 1000. The controller module 1005 provides a response 1057 to the recovered command 1055.

Typically, the other NFC capable device inductively couples a carrier wave on the antenna module 1001 as the received communications signal 1051 after it has transferred the polling command and/or the read command to the NFC device 1000. The controller module 1005 modulates this carrier wave with the response 1057 to provide a transmitted communications signal 1061. For example, an impedance of the antenna module 1001 varies based upon the response 1057 to vary a load of the other NFC capable device.

The power harvesting module 1007 may harvest power for the NFC device 1000 from the recovered communications signal 1053. The power couplings from the power harvesting module 1007 that supply the power to other modules of the NFC device 1000, such as the antenna module 1001, the demodulator module 1003, and/or the controller module 1005, are not shown in FIG. 10.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A method for detecting a Near Field Communication (NFC) device, comprising:
    polling with a first polling command using a first modulation scheme on a carrier field after a first guard time;
    maintaining the carrier field without modulation for a first reply period to detect a response to the first polling command from the NFC device;
    polling, directly after expiration of the first reply period and without waiting for a second guard time, with a second polling command using a second modulation scheme on the carrier field, the first and the second modulation schemes being characterized by a first characteristic and a second characteristic, respectively, the first characteristic being greater than the second characteristic; and
    maintaining the carrier field without modulation for a second reply period to detect a response to the second polling command from the NFC device.

2. The method of claim 1, further comprising:
    activating the carrier field;
    maintaining the carrier field without modulation during the first guard time; and
    communicating with the NFC device if the response to the first polling command is received from the NFC device while waiting during the first reply period.

3. The method of claim 2, further comprising:
    polling with a third polling command using a third modulation scheme on the carrier field;
    maintaining the carrier field without modulation for a third reply period to detect a response to the third polling command from the NFC device; and
    communicating with the NFC device if the response to the third polling command is received from the NFC device while waiting during the third reply period,
    wherein the third polling command is pursuant to a proprietary standard.

4. The method of claim 2, wherein the first polling command is directed to a Type B NFC technology tag, and
    wherein the second polling command is directed to a Type A NFC technology tag.

5. The method of claim 2, wherein the first polling command is directed to a Type F NFC technology tag, and
    wherein the second polling command is directed to a Type A NFC technology tag.

6. The method of claim 4, wherein the first modulation scheme is a 10% amplitude modulation, and
    wherein the second modulation scheme is a 100% amplitude modulation.

7. The method of claim 5, wherein the first modulation scheme is less than 100% amplitude modulation, and
    wherein the second modulation scheme is a 100% amplitude modulation.

8. A method for detecting a Near Field Communication (NFC) device, comprising:
    receiving a first polling command using a first modulation scheme on a carrier field after a first guard time from a NFC reader;

replying to the first polling command from the NFC reader during a first reply period if the NFC device is configured for the first modulation scheme;

receiving a second polling command using a second modulation scheme on the carrier field, directly after expiration of the first reply period and without a second guard time from the NFC reader, the first and the second modulation schemes being characterized by a first characteristic and a second characteristic, respectively, the first characteristic being greater than the second characteristic; and replying to the second polling command from the NFC reader during a second reply period if the NFC device is configured for the second modulation scheme.

9. The method of claim 8, further comprising:

deriving power from the carrier field without modulation during the first guard time.

10. The method of claim 9, further comprising:

receiving a third polling command using a third modulation scheme on the carrier field; and replying to the third polling command from the NFC reader during a third reply period if the NFC device is configured for the third modulation scheme, wherein the third polling command is pursuant to a proprietary standard.

11. The method of claim 9, wherein the first polling command is directed to a Type B NFC technology tag, and wherein the second polling command is directed to a Type A NFC technology tag.

12. The method of claim 9, wherein the first polling command is directed to a Type F NFC technology tag, and wherein the second polling command is directed to a Type A NFC technology tag.

13. The method of claim 11, wherein the first modulation scheme is a 10% amplitude modulation, and wherein the second modulation scheme is a 100% amplitude modulation.

14. The method of claim 12, wherein the first modulation scheme is less than 100% amplitude modulation, and wherein the second modulation scheme is a 100% amplitude modulation.

15. An apparatus for detecting a Near Field Communication (NFC) device, comprising:

a first NFC device configured to:

poll with a first polling command using a first modulation scheme on a carrier field after a first guard time;

maintain the carrier field without modulation for a first reply period to detect a response to the first polling command from the NFC device;

poll, directly after expiration of the first reply period and without waiting for a second guard time, with a second polling command using a second modulation scheme on the carrier field, the first and the second modulation schemes being characterized by a first characteristic and a second characteristic, respectively, the first characteristic being greater than the second characteristic; and maintain the carrier field without modulation for a second reply period to detect a response to the second polling command from the NFC device.

16. The apparatus of claim 15, wherein the first NFC device is further configured to:

activate the carrier field;

maintain the carrier field without modulation during the first guard time; and communicate with the NFC device if the response to the first polling command is received from the NFC device while waiting during the first reply period.

17. The apparatus of claim 16, wherein the first polling command is directed to a Type B NFC technology tag, and wherein the second polling command is directed to a Type A NFC technology tag.

18. The apparatus of claim 15, wherein the first polling command is directed to a Type F NFC technology tag, and wherein the second polling command is directed to a Type A NFC technology tag.

19. The apparatus of claim 17, wherein the first modulation scheme is a 10% amplitude modulation, and wherein the second modulation scheme is a 100% amplitude modulation.

20. The apparatus of claim 18, wherein the first modulation scheme is less than 100% amplitude modulation, and wherein the second modulation scheme is a 100% amplitude modulation.

21. The method of claim 1, wherein the first characteristic corresponds to an amplitude of the first modulation scheme and the second characteristic corresponds to an amplitude of the second modulation scheme.

22. The method of claim 1, wherein the first modulation scheme is configured according to a first NFC standard and the second modulation scheme is configured according to a second NFC standard, the first NFC standard being different than the second NFC standard.

23. The method of claim 8, wherein the first characteristic corresponds to an amplitude of the first modulation scheme and the second characteristic corresponds to an amplitude of the second modulation scheme.

24. The apparatus of claim 15, wherein the first characteristic corresponds to an amplitude of the first modulation scheme and the second characteristic corresponds to an amplitude of the second modulation scheme.

* * * * *